Nov. 8, 1938.  J. A. VANORIO, JR  2,136,032
HORSE'S TAIL PROTECTOR
Filed March 31, 1937
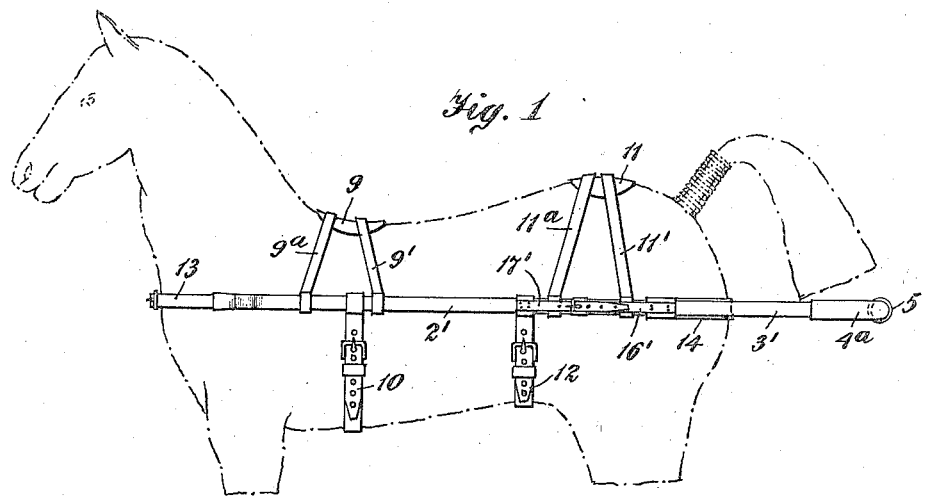
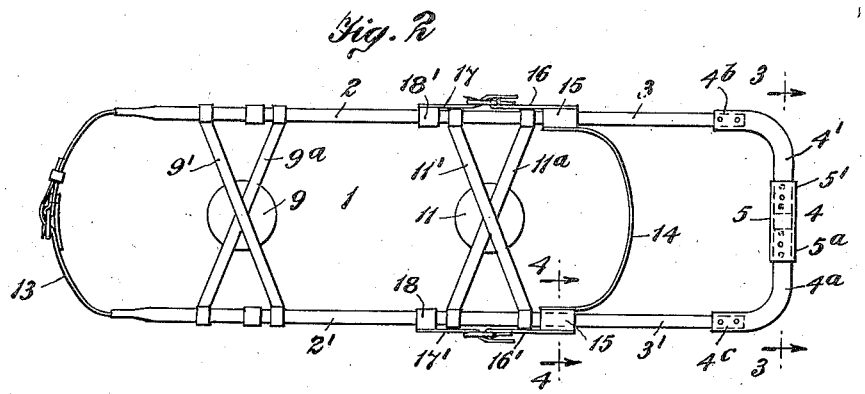
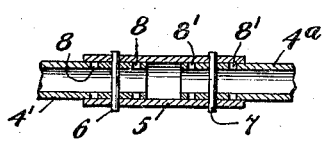 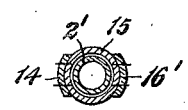
INVENTOR.
Joseph A. Vanorio Jr.
BY Joseph F. O'Brien
ATTORNEY.

Patented Nov. 8, 1938

2,136,032

UNITED STATES PATENT OFFICE 2,136,032

HORSE'S TAIL PROTECTOR

Joseph A. Vanorio, Jr., Mount Vernon, N. Y.

Application March 31, 1937, Serial No. 134,012

4 Claims. (Cl. 54—1)

This invention relates to improvements in horses' tail protectors.

It is the practice with certain types of horses, and particularly show-horses, to perform operations on their tails so that they will be permanently caused to be held in elevated position. This is accomplished by operating upon muscles in the tail and after such operation the tail must be thoroughly protected from contact with extraneous objects for a considerable period of time because an injury during such period after the operation is likely to cause the over-balancing of the muscles in the opposite direction or to the right or left so that the tail will be permanently held down or in other positions instead of elevated as desired, thus also creating a grave injury to the horse, and it is one of the objects of this invention to provide for the horse's tail a protector which, during the aforesaid convalescing period and thereafter, will thoroughly protect the horse's tail from injury, particularly while the horse is in his stall and will avoid any possibility of contact of the horse's tail with extraneous objects including the walls of the stalls and also which will permit the horse to move about freely in his stall without injuring his said tail and which will also permit the horse to lie down without injurious contact of the tail with the floor or other extraneous objects.

Another object of my invention is to utilize a tail protecting element or frame which will be capable of mounting directly on the horse.

Another object of my invention is to provide a tail-protecting element and a harness support for mounting the protector directly on the horse which will be adjustable in width and in length so as to snugly fit the horse about the breast, flanks, and sides and which will also carry a protector frame capable of adjustment in the width.

Another object of my invention is to utilize a protecting frame having a rearward extension to protect the tail and side shaft portions adapted to extend along the sides of the horse and to be snugly harnessed to the horse without chafing or otherwise injuring the horse and at the same time retaining the same in fixed position on the body of the horse.

Still another object of my invention is to provide a protector which will be capable of ready and easy attachment to the horse and which will be capable of mounting from the rear in the manner of conventional harness.

Another object of my invention is to provide a protector embodying a pair of side shafts composed of rigid material, such as steel, and having at the rear-end extensions preferably connected by an adjustable cross member serving as a rear bumper member which, as aforesaid, is adjustable in width.

Another object of my invention is to provide a device, of the character described, provided with supporting pads and straps at the saddle and top-back portions of the horse and having connections beneath the horse's belly by adjustable straps and also connected at the breast of the horse by an adjustable strap.

With these and other objects in view, the invention comprises the combination of members and arangement of parts so combined as to co-act and co-operate with each other in the performance of the functions and the accomplishment of the results herein contemplated, and comprises in one of its adaptations the species or preferred form illustrated in the accompanying drawing, in which:—

Fig. 1 is a view in side elevation of a device embodying my invention showing the same attached to horse illustrated in dotted lines;

Fig. 2 is a view in plan of the protector illustrated in Fig. 1 removed from the horse;

Fig. 3 is a section on the line 3—3 of Fig. 2 looking in the direction of the arrows;

Fig. 4 is a section on the line 4—4 of Fig. 2 looking in the direction of the arrows.

Referring now to the drawing which illustrates a preferred embodiment of my invention, I indicates a tail-protector particularly intended for protecting the tails of show horses during the period of convalescence after the tail has been operated upon to retain the same in elevated position and also after such period and preferably at all times during the use on the horse's tail of the conventional tail-set device and with or without such tail-set. My protector may be employed for any other purpose to which the device may be put. The tail-protector illustrated comprises a pair of shafts 2, 2' preferably composed of steel tubing so as to be light, strong and durable and adapted to extend along opposite sides of the flanks, ribs and shoulders of the horse and to be securely fastened to his body; and for this purpose being adjustable both in width and length and having rearwardly extending tail-protecting members 3, 3' extending lengthwise on opposite sides of the tail so as to prevent the horse, during a backing or side-prancing movement from bumping or injuring said tail. These extension members 3, 3' project rearwardly in the same plane of the shafts 2, 2' for a sufficient distance to prevent any such bumping of the tail and are preferably connected together at the rear-end by a bumper member 4 to reinforce the construction. In the embodiment of my invention shown, the member 4 comprises a pair of elbows 4', 4a connected at 4b, 4c to the extension member 3, 3' by riveting or in any other suitable manner. The elbows 4, 4a form a supplemental rearward extension and with the extension members 3, 3' provide a rearward-extension bumper portion which extends beyond the buttocks of the horse a distance equal to approximately one-fourth of the length of the shafts, or more. The opposite ends of the elbows 4', 4a are preferably connected together by an adjustable connecting member 5 within the ends 5', 5a of which the adjacent ends of the elbows 4', 4a extend and are fastened by pins 6 and 7. Adjustment in width is provided by employing a series of bores 8, 8' in each end of the elbows 4', 4a so that pins 6 and 7 which are removable, may be inserted in varying bores to procure varying adjustments in width.

The shafts 2, 2' are provided with suitable harness to attach and retain the same in firmly supported position on the body of the horse. Thus I provide a back-supporting withers-pad 9 provided with a pair of diagonally extending and crossing straps 9', 9a fastened to the shafts adjacent to the front portion of the shafts which are fastened at this position by a forward belly-band 10 while the rear portion of the shafts is supported by a rear-back or croup pad 11 having oppositely inclined and crossing supporting straps 11', 11a extending to the opposite shafts and having a rear belly-band 12 also connected to said shafts at this position. The forward ends of the said shafts are also connected together across the breast of the horse by a breast strap 13 which is adjustable to fit horses of different sizes and is also adjustable to enable tightening of the protector on the horse at this portion. The rear-ends of the shafts are fastened to the horse by a breeching strap 14 which is adjustable longitudinally on the shafts. In the preferred embodiment of my invention the breeching strap is connected to the inner surface of slidable sleeve members 15 and to the outer surface of these sleeves are connected straps 16, 16' having adjustable connections with straps 17, 17' connected to sleeves 18, 18' fastened to and supported on the shafts.

Having described my invention, I claim:

1. A horse's tail protector comprising, in combination, a pair of shafts having members extending at opposite sides of the horse and each shaft having portions positioned in registration with the ribs and flank of the horse, a tail-protecting bumper element connected to and supported by said shafts and having rearward extension portions projecting rearwardly of the buttocks of the horse, and harness for snugly fitting and retaining said shafts and bumper element on the horse including supporting members resting on the back of the horse and fastened to the shafts and breast and breeching straps abutting the breast and buttocks of the horse and also fastened to said shafts, whereby the horse, during a backward or sidewise movement in a stall, is prevented from bumping his tail against extraneous objects.

2. A horse's tail protector comprising, in combination, a pair of shafts having members extending at opposite sides of the horse and each shaft having portions positioned in registration with the ribs and flank of the horse, a tail-protecting bumper element connected to and supported by said shafts and having rearward extension portions projecting rearwardly of the buttocks of the horse, and harness for snugly fitting and retaining said shafts on the horse comprising shaft supporting members resting on the withers and rear back of the horse, forward and rear belly bands and breast and breeching straps all snugly fitting the horse and fastened to the said shafts, whereby the horse, during a backward or sidewise movement, is prevented from bumping his tail against extraneous objects.

3. A horse's tail protector comprising, in combination, a pair of shafts having members extending at opposite sides of the horse and each shaft having portions positioned in registration with the ribs and flank of the horse, harness for attaching and retaining said shafts in firmly supported position on the body of the horse, and a tail-protector connected to and supported by said shafts and comprising a bumper element having rearward extension portions projecting rearwardly of said flank-registering shaft portions, said bumping element including a transverse member extending across the rear end of the horse and connected at its opposite ends with the ends of said extension portions, and means for adjusting the width of said bumper member laterally.

4. A horse's tail protector comprising, in combination, a pair of shafts having members extending at opposite sides of the horse and each shaft having portions positioned in registration with the ribs and flank of the horse, harness for attaching and retaining said shafts in firmly supported position on the body of the horse, and a tail protector connected to and supported by said shafts and comprising a bumper element having rearward extension portions projecting rearwardly of said flank-registering shaft portions, said bumping element including a transverse member extending across the rear end of the horse and connected at its opposite ends with the ends of said extension portions, means for adjusting the width of said bumper member laterally, and said transverse and extension portions having a connection adapted to permit longitudinal adjustment.

JOSEPH A. VANORIO, Jr.